US005705600A

United States Patent [19]

Jones et al.

[11] Patent Number: 5,705,600
[45] Date of Patent: Jan. 6, 1998

[54] POLYESTER/ NAPHTHALENEDICARBOXYLIC ACID-CONTAINING POLYMER BLENDS DISPLAYING REDUCED FLUORESCENCE

[75] Inventors: Allan Scott Jones, Church Hill; Jean Carroll Fleischer; Max Allen Weaver, both of Kingsport, all of Tenn.

[73] Assignee: Eastman Chemical Company, Kingsport, Tenn.

[21] Appl. No.: 577,796

[22] Filed: Dec. 22, 1995

[51] Int. Cl.$^6$ .................................. C08G 63/189
[52] U.S. Cl. .................. 528/298; 528/299; 528/302; 528/305; 528/332; 525/432; 525/437
[58] Field of Search ........................ 525/432, 437; 528/298, 299, 302, 305, 332

[56] References Cited

U.S. PATENT DOCUMENTS

| | | | |
|---|---|---|---|
| 5,310,859 | 5/1994 | Kishiro et al. | 528/308 |
| 5,352,761 | 10/1994 | Jones et al. | 528/298 |
| 5,391,330 | 2/1995 | Jones et al. | 264/21 |
| 5,391,701 | 2/1995 | Jones et al. | 528/298 |
| 5,391,702 | 2/1995 | Jones et al. | 528/298 |
| 5,391,862 | 2/1995 | Amateau et al. | 219/667 |
| 5,418,318 | 5/1995 | Jones et al. | 528/298 |

OTHER PUBLICATIONS

Shangxian et al., "Fluorescence Spectra of Poly (Ethylene 2,6–Naphthalene Dicarboxylate)", *Scientia Sinica*, XXIV, 5, (1981) May.

Ti, et al, "Intermolecular Excimer Interaction in Poly(Polytetramethylene Ether Glycol Aryl Dicarboxylate)"; *Acta Chimica Sinica*, 42, 1, (1984), The month of publication is not available.

Chemical Abstracts, vol. 77, No. 26, 25 Dec. 1972, Columbus, Ohio, US; abstract No. 165598d, Tsunawaki,K. et al.: "transparent polyesters", p. 39.

Research Disclosure 369–036–A (Jan. 1995).

*Primary Examiner*—Morton Foelak
*Assistant Examiner*—P. Hampton-Hightower
*Attorney, Agent, or Firm*—Karen A. Harding; Harry J. Gwinnell

[57] ABSTRACT

The present invention relates to blends of a polyester, polyamide or polyester/amide containing a copolymerizable fluorescence quenching compound and a second polymer. The blends of the present invention display reduced fluorescence. Specifically the blends comprise (a) a polyester/amide comprising:

(1) a dicarboxylic acid component which comprises at least 0.1 mol % of a dicarboxylic acid selected from the group consisting of terephthalic acid and/or terephthalate ester;

(2) a diol and/or diamine component;

(3) 0.1 to 99.9 mol %, based on 100 mol % dicarboxylic acid and 100 mol % diol, of a copolymerizable fluorescence quenching compound;

(b) a second polymer selected from the group poly(alkylene terephthalate) homo and copolyesters, poly(alkylene naphthalate) homo and copolyesters, poly(cycloalkylene terephthalate) homo and copolyesters, poly(alkylene 1,4-cyclohexanedicarboxylate) homo and copolyesters, and polycarbonate homo and copolymers.

17 Claims, No Drawings

POLYESTER/NAPHTHALENEDICARBOXYLIC ACID-CONTAINING POLYMER BLENDS DISPLAYING REDUCED FLUORESCENCE

FIELD OF THE INVENTION

This invention relates to polyester/polymer blend compositions containing naphthalene dicarboxylate repeat units having reduced fluorescence. The decrease in fluorescence is accomplished by blending a polymer which consists of terephthalate repeat units and a high level of copolymerized fluorescence quencher with another polymer(s) such as PEN, PET, naphthalenedicarboxylic acid-containing copolymer, and the like.

BACKGROUND OF THE INVENTION

Poly(ethylene 2,6-naphthalenedicarboxylate), referred to as PEN, is widely used as an extrusion and injection molding resin because of its good heat resistance, high glass transition temperature, and gas barrier properties. PEN is used in the fabrication of various articles for household or industrial use, including appliance parts, containers, and auto parts. One major drawback of PEN, however, is its inherent bluish fluorescence. Thus, objects prepared from PEN have a hazy bluish appearance. This phenomenon is especially of concern in the packaging of foods and beverages when the food or beverage inside the PEN container appears unnatural.

Fluorescence is a type of luminescence in which an atom or molecule emits radiation in passing from a higher to a lower electronic state. The term is restricted to phenomena in which the time interval between absorption and emission of energy is extremely short ($10^{-10}$ to $10^{-6}$). Fluorescence in a polymer or small molecule, occurs when a photon is emitted from an excited single state. Quenching of fluorescence eliminates or reduces the ability for photon emission by providing an alternative pathway for the excited state energy such as vibronic or heat loss, or intersystem crossing to the excited triplet state.

Methods to-quench fluorescence in PEN have been disclosed by Chen Shangxian, et al. in an article entitled, "Fluorescence Spectra of Poly(Ethylene 2-6-Naphthalene Dicarboxylate)" which appeared in SCIENTIA SINICA, Vol. XXIV, No. 5, May 1981, and by CAO Ti, et al. in an article entitled, "Intermolecular Excimer Interaction in Poly (Polytetramethylene Ether Glycol Aryl Dicarboxylate)" which appeared in ACTA CHIMICA SINICA, Vol. 42, No. 1, 1984. Both of the references disclose the use of o-chlorophenol to quench PEN fluorescence in a chloroform solution. Dissolving PEN in a chloroform solution to disperse the fluorescence quencher therein, however, is not practical on an industrial scale because only very dilute PEN solutions can be prepared. In addition, the PEN must have a low molecular weight to dissolve in the chloroform solution.

U.S. Pat. No. 5,310,859 (1994) discloses poly(ethylene 2,6-naphthalenedicarboxylate) polymers containing 0.1 to 5 mole % of a copolymerizable aromatic ketone which have reduced fluorescence.

U.S. Pat. No. 5,352,761 discloses certain naphthalene derivatives which are useful in providing reduced fluorescence in polyesters such as PEN and are copolymerizable with polyesters.

U.S. Pat. No. 5,391,701 (1995) discloses the use of polyester copolymerizable halo-aromatic compounds copolymerized with PEN and having reduced fluorescence.

U.S. Pat. Nos. 5,391,702 and 5,391,330 disclose a process for preparing PEN or dimethyl 2,6-naphthalene dicarboxylate containing copolyesters/fluorescence quencher blends via melt blending which have reduced fluorescence.

U.S. Pat. No. 5,393,862 (1995) discloses the use of dimethyl 2,6-naphthalene dicarboxylate-containing copolyesters or copolyamides having a copolymerized aromatic ketone compound and having reduced fluorescence.

U.S. Pat. No. 5,418,318 discloses the use of dimethyl 2,6-naphthalene dicarboxylate-containing copolyesters or copolyamides having a copolymerized halo-aromatic compound and having reduced fluorescence.

D. E. Mills, et al., U.S. application Ser. No. 08/360,549 discloses PEN and dimethyl 2,6-naphthalene dicarboxylate-containing polymer compositions copolymerized with aromatic thioether compounds with reduced fluorescence. High levels of the aromatic thioether compound were copolymerized into PEN and then the fluorescence quencher-containing polymer was blended with PEN to reach ultimate quench levels of 0.1–5.0 mol %.

Research Disclosure RD 369,036-A (Jan. 1995) discloses the use of various hydroxy benzophenones in quenching fluorescence in PEN by melt blending 0.5–5 wt % of the various small molecules with PEN.

None of the above references teaches the use of blending a PET-containing quencher with other polymers. Frequently, there are reasons to blend two or more polymers in order to provide enhanced physical properties or for economic reasons. Such is the case with PEN blends with poly(ethylene terephthalate) (referred to as PET), PET copolyesters, or polycarbonate homo- and co-polymers. Such blends (even those containing very small amounts of PEN polymers) show excessive fluorescence.

SUMMARY OF THE INVENTION

The present invention relates to blends of polyester compositions containing a fluorescence quencher with other polymers, particularly polymers which contain ethylene naphthalate moieties. Specifically, the polyester/quencher/polymer blends of the present invention comprise:

(a) a polyester/amide comprising:
  (1) a dicarboxylic acid component which comprises at least 0.1 mol % of a dicarboxylic acid selected from the group consisting of terephthalic acid and/or terephthalate ester;
  (2) a diol and/or diamine component;
  (3) 0.1 to 99.9 mol %, based on 100 mol % dicarboxylic acid and 100 mol % diol, of a copolymerizable fluorescence quenching compound;
(b) a second polymer selected from the group poly(alkylene terephthalate) homo and copolyesters, poly(alkylene naphthalate) homo and copolyesters, poly(cycloalkylene terephthalate) homo and copolyesters, poly(alkylene 1,4-cyclohexane-dicarboxylate) homo and copolyesters, and polycarbonate homo and copolymers.

The final level of the quencher in the blend is 0.1–10 wt %, preferably 0.5–5 wt %, most preferably 0.5–2.0 wt %.

DESCRIPTION OF THE INVENTION

The poly(ethylene terephthalate) (PET) based polyester of the present invention contains repeat units from a dicarboxylic acid, a diol and/or diamine and a copolymerizable fluorescence quenching compound.

The dicarboxylic acid component comprises at least 0.1 mol % terephthalic acid or ester, isophthalic acid or esters or mixtures thereof. However, terephthalic acid in the preferred isomer.

The dicarboxylic acid component may optionally be modified with up to 20 mol % of one or more different dicarboxylic acids other than terephthalic acid or ester. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids included with terephthalic acid or ester are 2,6-naphthalenedicarboxylic acid and esters. Other naphthalenedicarboxylic acids or their esters may also be used. These include the 1,4-, 1,5-, 2,7-, 1,2-, 1,3-, 1,6-, 1,7-, 1,8-, 2,3-, 2,4-, 2,5-, and 2,8-naphthalenedicarboxylic acids. Also mixtures of the various isomers may be used in the polyesters. However, 2,6-naphthalenedicarboxylic acid is the preferred naphthalenedicarboxylic acid modifying acid. Other acids or esters that can be used include phthalic acid; isophthalic acid; cyclohexanediacetic acid; diphenyl 4,4'-dicarboxylic acid; succinic acid; glutaric acid; adipic acid; fumaric acid; azelaic acid; resorcinoldiacetic acid; diglycolic acid; 4,4'-oxybis(benzoic) acid; biphenyldicarboxylic acid; 1,12-dodecanedicarboxylic acid; 4,4'-sulfonyldibenzoic acid; 4,4'-methyldibenzoic acid; trans 4,4'-stilbene-dicarboxylic acid; 1,2-, 1,3-, and 1,4-cyclohexane dicarboxylic acids; and the like. It should be understood that use of the corresponding acid arthydrides, esters and acid chlorides of these acids is included in the term "dicarboxylic acid". The polyester may be prepared from one or more of the above dicarboxylic acids or esters.

The diol component is selected from cycloaliphatic diols preferably having 6 to 20 carbon atoms or aliphatic diols preferably having 2 to 20 carbon atoms. Examples of such diols include ethylene glycol, diethylene glycol, triethylene glycol, 1,4-cyclohexanedimethanol, 1,3-propanediol, 1,4-butanediol, 1,5-pentanediol, 1,6-hexanediol, 2,2-dimethyl-1,3-propanediol, 1,10-decanediol, 2,2,4,4-tetramethyl-,1,3-cyclobutanediol, 3-methyl-2,4-pentanediol, 2-methyl-1,4-pentanediol, 2,2,4-trimethyl-1,3-pentanediol, 2-ethyl-1,3-hexanediol, 2,2-diethyl-1,3-propanediol, 1,3-hexanediol, 1,4-bis-(hydroxyethoxy)benzene, 2,2-bis-(4-hydroxycyclohexyl)-propane, 2,4-dihydroxy-1,1,3,3-tetramethylcyclobutane, 2,2-bis-(3-hydroxyethoxyphenyl) propane, and 2,2-bis-(4-hydroxypropoxyphenyl) propane. The diol component is preferably selected from ethylene glycol, 1,4-butanediol, cyclohexanedimethanol, and mixtures thereof. The preferred diols may be modified with up to about 50 mol % and more preferably up to about 20 mol % of any of the other diols disclosed herein.

Suitable diamines contain reactive primary diamino functional groups and have the following structure:

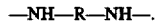

—NH—R—NH—.

R can be alkylene, cycloalkylene, arylalkylene, or arylene. Preferably R is an alkylene having 2 to 6 carbon atoms, cycloalkylene having 6 to 14 carbon atoms or an arylalkylene having 6 to 16 carbon atoms. More preferably the diamine is selected from hexamethylenediamine (HMDA), butanediamine (BD), ethylenediamine (ED), 1,4 and 1,3-cyclohexanediamine (CD), 1,4 and 1,3-cyclohexanebismethylamine (CHBMA), methylenebisaniline (MDA), 1,3 and 1,4-xylylenediamine (XDA) and bis(p-aminocyclohexyl)methane (BACHM). Other reactive diamines can be likewise incorporated into the polyesteramides of this invention.

The polyester may also contain small amounts of trifunctional or tetrafunctional comonomers such as trimellitic anhydride, trimethylolpropane, pyromellitic dianhydride, pentaerythritol, and other polyester forming polyacids or diols generally known in the art.

The copolymerizable fluorescence quencher component comprises of 0.1 to 99.9 mol %, based on 100 mol % dicarboxylic acid and 100 mol % diol, of a suitable copolymerizable fluorescence quenching diacid, diester, diol, or hydroxy acid. Preferably, the quencher-containing polyester contains repeat units from 70–100 mol % terephthalic acid or ester, and at least 90 mol % ethylene glycol. More preferably, the quencher-containing polyester contains at least 85 mol % of repeat units from terephthalic acid or ester, and at least 95 mol % ethylene glycol repeat units.

Component (c) of the present invention is 0.1 to 99.9 mol % of a suitable copolymerizable fluorescence quenching compound. Any copolymerizable fluorescence quenching compound which will provide significant reduction of the inherent bluish fluorescence of PEN polymers comes within the scope of this invention. Suitable copolymerizable fluorescence quenching compounds include those disclosed in U.S. Pat. Nos. 5,310,859, 5,391,701 and U.S. application Ser. No. 08/360,549, all of which are incorporated herein by reference. Generally the PET based polyester must contain at least 0.1 mol % of the copolymerizable fluorescence quenching compound to provide a desirable quenching effect in the resultant blends. It is also possible to use the master batch approach in which a PET polymer containing a large amount (e.g. 20 mol % or more) of a copolymerizable fluorescence quenching compound is blended with unmodified PET as well as one or more other polyesters and/or polycarbonates. In such cases, the final concentration of the copolymerizable fluorescence quenching compound in the PET moiety (before blending) will generally be about 0.5–40 mol %, preferably 1–20 mol %.

The copolymerizable fluorescence quenching compounds are described by the following general Formula I

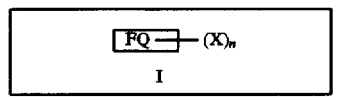

I wherein FQ is a fluorescence quencher moiety selected from the classes of aromatic ketones, halogen containing aromatic compounds, aromatic thioether compounds and the like; X is a polyester reactive group; n is 1 to 4, preferably 2.

Polyester reactive groups X include aliphatic hydroxy, carboxy, amino, $C_1$ to $C_6$ alkylamino and ester radicals having the formulae:

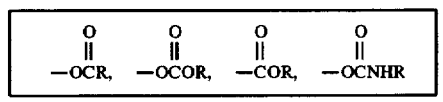

wherein R is selected from $C_1$ to C6-alkyl, $C_5$ to $C_7$-cycloalkyl, phenyl or substituted phenyl. The aliphatic hydroxy group has the formula $(CH2)_mOH$, wherein m is an integer from 1 to 6, preferably 2.

When the copolymerizable fluorescent quencher of Formula I is an aromatic ketone the aromatic portion is selected from benzene, naphthalene and biphenyl moieties and these substituted with one or more groups selected from halogen, hydroxyl, $C_1$ to C6-alkyl or $C_1$ to $C_6$-alkoxy. Preferably, two polyester reactive carboxy or carboxylic acid ester groups are attached to the aromatic portion of the fluorescence quenchers. In addition to the polyester reactive groups, the aromatic ring contains at least one acyl group which has the structure:

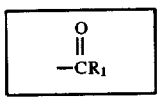

wherein $R_1$ is selected from $C_1$ to $C_{10}$ alkyl, phenyl, substituted phenyl, naphthyl, substituted naphthyl. Examples of acyl groups include acetyl, propionyl, butyryl, isobutyryl, benzoyl, 4-methylbenzoyl, 3-methylbenzoyl, 2-methylbenzoyl, 4-ethoxybenzoyl, 3-methoxybenzoyl, 4-hydroxybenzoyl, 4-bromobenzoyl, 2-chlorobenzoyl, 3-iodobenzoyl, 4-n-butylbenzoyl, 4-phenylbenzoyl, 4-phenoxybenzoyl, 4-methylthiobenzoyl, 4-phenylthiobenzoyl, 1-naphthoyl, and 2-naphthoyl. The most preferred acyl group is benzoyl. The acyl groups may be attached to any Of the unsubstituted positions on the aromatic ring(s). Preferred copolymerizable aromatic ketones include dimethyl benzoylterephthalate, benzoylterephthalic acid, dimethyl 1-benzoyl-2,6-naphthalenedicarboxylate, 1-benzoyl-2,6-naphthalenedicarboxylic acid, dimethyl 3-benzoyl-2,6-naphthalenedicarboxylate, dimethyl 4-benzoyl-2,6-naphthalenedicarboxylate, dimethyl 1-(2-naphthoyl)-2,6-naphthalenedicarboxylate, dimethyl 5-benzoylisophthalate, dimethyl 2-benzoyl-6-bromoterephthalate, dimethyl 2-benzoyl-5-iodoterephthalate, dimethyl 2-benzoyl-6-iodoterephthalate, dimethyl 2-benzoyl-5-bromoterephthalate and the like.

The copolymerizable halogenated aromatic fluorescence quenchers of Structure I contain an aromatic portion selected from benzene, naphthalene, and biphenyl moieties and these substituted with one or more groups selected from $C_1$ to C6-alkyl and $C_1$ to C6-alkoxy. Preferably, two polyester reactive carboxy or carboxylic acid ester groups (X) are attached to the aromatic portion of the fluorescence quencher. In addition to the polyester reactive groups (X), the aromatic ring(s) contains one or more halogen atoms selected from fluorine, chlorine, bromine, and iodine. If the moiety providing the quenching effect is halogen then bromine and/or iodine must be present and additional halogens are optional. However, if another quenching moiety is present any of the listed halogens may be included. Exemplary copolymerizable halogen containing aromatic fluorescence quenchers include dimethyl iodoterephthalate, iodoterephthalic acid, dimethyl 4-bromo-2,6-naphthalenedicarboxylate, 4-bromo-2,6-naphthalenedicarboxylic acid, dimethyl 1-bromo-2,6-naphthalenedicarboxylate, dimethyl 3-bromo-2,6-naphthalenedicarboxylate, dimethyl 1-iodo-2,6-naphthalenedicarboxylate, dimethyl 3-iodo-2,6-naphthalenedicarboxylate, 3-iodo-2,6-naphthalenedicarboxylic acid, dimethyl 4-iodo-2,6-naphthalenedicarboxylate, dimethyl 2-bromo-5-iodoterephthalate, dimethyl 2-bromo-6-iodoterephthalate, and the like.

The copolymerizable fluorescent quencher compounds of Formula I wherein FQ is an aromatic thioether moiety are more adequately described by the general structure:

wherein $n_1$ is 1 to 4, preferably 2; $R_2$ is selected from $C_1$ to $C_{12}$-alkyl, $C_5$ to C7-cycloalkyl, $C_3$ to $C_8$-alkenyl, $C_3$ to $C_8$ alkynyl, phenyl, substituted phenyl, or —L—X, wherein L is an organic divalent linking group and X is a polyester reactive group; with the provision that at least one —L—X group must be present; Ar is an aromatic radical selected from benzene, naphthalene, biphenyl, and

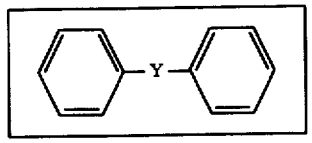

and these substituted with one or more groups selected from halogen, $C_1$ to C6-alkyl as $C_1$ to C6-alkoxy; Y is selected from

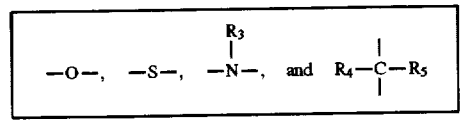

wherein $R_3$ is selected from hydrogen, $C_1$ to C6-alkyl, $C_5$ to C7-cycloalkyl, phenyl, substituted phenyl and —L—X; $R_4$ and $R_5$ are independently selected from $C_1$ to C6-alkyl, phenyl and substituted phenyl.

In the above definition of the fluorescent quenchers of Formula I, the terms "$C_1$ to C6-alkyl" and "$C_1$ to $C_{12}$-alkyl" are used to designate straight or branched chained hydrocarbon radicals containing up to 6 and up to 12 carbons, respectively, and these substituted with one or more groups selected from $C_1$ to C6-alkoxy, $C_5$ to C7-cycloalkyl, halogen, hydroxy, acetoxy, cyano, phenyl, and substituted phenyl.

In the term "$C_1$ to C6-alkoxy" the alkyl radical is a straight or branched chain alkyl group containing up to 6 carbon atoms optionally substituted with one or more groups listed above as possible Substituents on the $C_1$ to $C_6$ alkyl groups.

The terms "$C_3$ to $C_8$-alkenyl" and "$C_3$ to $C_8$-alkynyl" are used to denote aliphatic hydrocarbon moieties having 3 to 8 carbon atoms and at least one carbon-carbon double bond or carbon-carbon triple bond, respectively.

The term "halogen" is used to indicate fluorine, chlorine, bromine, and iodine, unless otherwise indicated.

The term "$C_5$ to C7-cycloalkyl" is used to describe a cycloaliphatic radical containing 5 to 7 ring carbon atoms and which may be further substituted with one or more $C_1$ to C6-alkyl groups.

The terms "substituted phenyl" and "substituted naphthyl" are used to describe phenyl and naphthyl radicals, respectively, containing one or more substituents selected from $C_1$ to C6-alkyl, hydroxyl, $C_1$ to C6-alkoxy, halogen, and hydroxy.

In the definition of L, the term "organic divalent linking group" includes $C_1$ to $C_{12}$-alkylene, $C_1$ to $C_4$-alkylene-cyclohexylene-$C_1$ to $C_4$-alkylene, arylene, $C_1$ to $C_4$-alkylene arylene, $C_1$ to $C_4$-alkylene-S-arylene, $C_1$ to $C_4$-alkylene-O-arylene, $C_1$ to $C_4$-alkylene-arylene-$C_1$ to $C_4$-alkylene, $C_1$ to $C_4$-alkylene-S-$C_1$-$C_4$-alkylene, $C_1$ to $C_4$-alkylene-O-arylene-O-$C_1$ to $C_4$ alkylene, $C_1$ to $C_4$-alkylene-Y-$C_1$ to $C_4$-alkylene or $CH_2CH_2O)m_1CH_2CH_2$-, wherein "arylene" is used to denote 1,2-, 1,3-, and 1,4-phenylene and those radicals substituted with one or more groups selected from $C_1$ to C6-alkyl, $C_1$ to C6-alkoxy, carboxy, $C_1$ to C6-alkoxycarbonyl; the term "cyclohexylene" is used to denote 1,2-, 1,3-, and 1,4-cyclohexylene radicals; the terms "$C_1$ to $C_4$-alkylene" and "$C_1$ to $C_{12}$-alkylene" are used to denote straight or branched divalent aliphatic hydrocarbon radicals containing up to 4 and up to 12 carbon atoms, respectively, and those substituted with one or more groups selected from hydroxy, $C_1$ to C6-alkanoyloxy, carboxy, $C_1$ to $C_6$-alkoxycarbonyl, $C_1$ to $C_6$-alkoxy, phenyl, substituted phenyl and halogen; Y is as previously defined; $m_1$ is 1 to 10; the alkyl portion the "$C_1$ to $C_6$-alkoxycarbonyl" and "$C_1$ to $C_6$-alkanoyloxy" radicals contain 1 to 6 carbon atoms.

Preferably L is $C_1$ to $C_6$-alkylene (most preferably ethylene), $C_1$ to $C_6$-alkylene-arylene (most preferably $CH_2$-1,2-, 1,3-, and 1,4-phenylene) or arylene (most preferably 1,2-, 1,3-, and 1,4-phenylene).

The aromatic thioether compounds of Structure 1, wherein FQ is an aromatic thioether moiety are prepared by Method I or Method II.

Method I

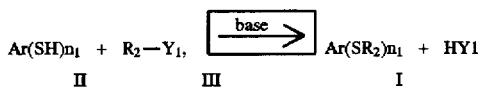

Method II

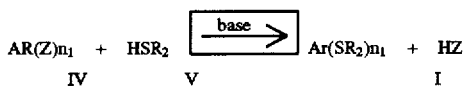

The intermediate arylthiol compounds II used in Method I are prepared by reacting an aromatic bromide and iodide with thiourea in the presence of a nickel metal catalyst as described in U.S. Pat. No. 5,338,886 which is incorporated herein by reference. Compounds II are then converted to aromatic thioethers I by reacting with Compounds III, wherein $Y_1$ is a leaving group selected from chlorine, bromine, iodine, $C_1$ to $C_6$-alkylsulfonyloxy and phenylsulfonyloxy; At, $R_2$, and $n_1$ are as previously defined.

Aromatic thioether compounds of Structure I may also be prepared by Method II which involves the reaction of aromatic halides IV, wherein Z is selected from bromine and iodine, with an organic mercaptan V in the presence of base.

In preparing the preferred aromatic thioether compounds which contain a polyester reactive group, the group may be present in reactants III and V or may be introduced later into the aromatic thioether compounds of Structure I by a subsequent reaction.

The preferred bases for promoting the nucleophilic displacement reactions involved in Methods I and II are alkali metal hydroxides, bicarbonates, and carbonates or tertiary amines. Useful solvents include polar aprotic materials such as N,N-dimethylformamide, N-methyl-2-pyrrolidinone, dimethylsulfoxide, and the like.

The polyesters which are blended with the PET copolyesters containing the fluorescence quenching compound are generally based on terephthalic acid, 1,4-cyclohexanedicarboxylic acid, isophthalic acid, naphthalenedicarboxylic acid and the like, and one or more glycols containing 2 to about 12 carbon atoms. Preferred glycols include ethylene glycol, 1,4-butanediol, 1,6-hexanediol, 1,4-cyclohexane-dimethanol, and 2,2-dimethyl-1,3-propanediol. Homo and copolyesters may be used. The copolyesters may contain up to about 50 mol % of modifying dibasic acids and/or glycols. Typical modifying dibasic acids include isophthalic, adipic, glutaric, azelaic, sebacic and the like while modifying glycols will include those of 2 to about 12 carbon atoms and may be aliphatic or alicyclic in nature. Useful polyesters include PET, PET copolyester containing 5 mol % isophthalic acid, PET copolyester containing 31 mol % 1,4-cyclohexane-dimethanol, PET copolyester containing 37 mol % diethylene glycol, PET copolyester containing 50 mol % 1,4-butanediol, poly(1,4-butyleneterephthalate) (PBT), PBT copolyester containing 15 mol % ethylene glycol, poly(ethylene 1,4-cyclohexanedicarboxylate), poly(1,4-cyclohexylenedimethylene terephthalate) (PCT), PCT copolyester containing 18 mol % ethylene glycol and the like. All of these polyesters are readily prepared by methods well known to those skilled in the art.

The polycarbonate polymers are well known molding plastics. They are generally derived from phosgene and dihydroxy aromatic compounds such as 4,4'-isopropylidenediphenol (Bisphenol A). Certain polycarbonate copolyesters such as those modified with aromatic dibasic acids (e.g., terephthalic acid) are also well-known. The inherent viscosity (I.V.) values of useful polycarbonate will generally be in the range of about 0.2 to about 1.2 dL/g.

The blends of this invention are readily prepared in conventional melt processing equipment such as Brabender extruder equipment, single-screw extruders, twin-screw extruders and the like. The blends are generally processed at temperatures in the range of about 260° C. to about 330° C. Properties of the blends may be altered significantly depending on the mixing temperature and mixing time. For example, longer processing times lead to a greater degree of transesterification between the PET polymer and the additional polyester components. Generally, processing times in the range of about 0.4 to about 5 minutes are useful to achieve the desired results.

The blends will generally contain about 0.1 to about 99.9 weight % of the PET component containing the copolymerizable fluorescence quenching compound and about 99.9 to about 0.1 weight % of the other polyester components.

Many other ingredients can be added to the compositions Of the present invention to enhance the performance properties of the polyester. For example, surface lubricants, denesting agents, stabilizers, antioxidants, ultraviolet light absorbing agents, mold release agents, metal deactivators, colorants such as black iron oxide and carbon black, nucleating agents, phosphate stabilizers, zeolites, fillers, and the like, can be included herein. All of these additives and the use thereof are well known in the art. Any of these compounds can be used so long as they do not hinder the present invention form accomplishing its objects.

The poly(ethylene terephthalate) polymer with the fluorescence quenching compound is prepared by conventional polycondensation procedures well known in the art which generally include a combination of melt phase and solid state polymerization. Melt phase describes the molten state of PET during the initial polymerization process. The initial polymerization process includes direct condensation of the terephthalic acid with ethylene glycol or by ester interchange using dimethyl terephthalate. Dimethyl terephthalate is ester interchanged with ethylene glycol at elevated temperatures in the presence of the copolymerizable fluorescence quenching compound and suitable catalysts. The melt phase is concluded by extruding the PET polymer into strands and pelletizing. Optionally, the copolymerizable fluorescence quenching compound can be melt blended with poly(ethylene terephthalate).

The poly(ethylene terephthalate) with the fluorescence quenching compound may optionally be solid state polymerized. Solid state polymerization involves heating the PET pellets to a temperature in excess of 180° C., but well below the crystalline melt point, either in the presence of an inert gas stream or in a vacuum to remove a diol. Several hours are generally required in the solid state polymerized unit to build the molecular weight.

Typical catalysts which may be used include titanium alkoxides, dibutyl in dilaurate, combinations of zinc, manganese, or magnesium acetates or benzoates with antimony oxide or antimony triacetate.

The inherent viscosity of the polyester should be 0.3 to 1.5 dL/g. However, inherent viscosities from 0.5 to 0.9 are preferred, as measured at 25° C. using 0.50 grams of polymer per 100 mL of solvent consisting of 60% by weight phenol and 40% by weight tetrachloroethane.

The poly(ethylene terephthalate) compositions serve as excellent starting materials for the production of moldings of all types. Specific applications include food packaging such as bottles, trays, lids and films, medical parts, appliance parts, automotive parts, tool housings, and recreational and utility parts. The molding compositions of the present invention are especially useful in applications that require transparent molded parts. Additionally, the polyesters can be used to prepare extruded sheets for thermoforming applications. The polyesters are readily extruded into films or processed into monolayer or multilayer food and beverage containers. Potential methods for producing containers include: (1) injection stretch blow molding using either one or two stage technology, (2) injection blow molding, (3) extrusion blow molding, (4) pipe extrusion, and (5) co-injection or co-extrusion where the polyesters can serve as either the structural layer or barrier layer depending upon end use requirements. Fibers, melt blown webs, extruded sheets, vacuum drawn trays/parts, injection molded parts, and extrusion coated wires may also be made from these polyesters.

The materials and testing procedures used for the results shown herein are as follows: Fluorescence Intensity was determined using a Perkin Elmer LS5B Luminescence Spectrometer which measures relative fluorescence intensity.

The composition of the polyesters was determined using $^1$HNMR spectroscopy.

Glass transition temperature (Tg) and melting temperature (Tm) were determined by differential scanning calorimetry (DSC) using a Perkin Elmer DSC II instrument. The Tg and Tm were determined using a 20° C./minute scan rate after the samples have been heated above the Tm and quenched below the Tg.

Inherent viscosity (I.V.) was measured at 25° C. using 0.50 grams of polymer per 100 mL of a solvent consisting of 60% by weight phenol and 40% by weight tetrachloroethane.

Sample preparation for determining fluorescence intensity involved micropulverizing the extruded and crystallized pellets in an analytical grinding mill and passing through a 120 mesh screen. Approximately 0.5 grams of the powder were packed into a sample holder and measurements were taken by reflectance. The excitation wavelength was 350 nm. Fluorescence results are listed in Table I and Table II.

The present invention will be further illustrated by a consideration of the following examples, which are intended to be exemplary of the invention. All parts and percentages in the examples are on a weight basis unless otherwise stated. It should be understood that all numbers reported are prefaced by the word "about".

EXAMPLES

Examples 1-5

EASTMAN PEN Homopolymer 14991 (Ih.V.=0.56 dL/g) and EASTMAN PET 12440 (Ih.V.=0.72dL/g) were dried overnight in a forced air drying unit. The homopolymer blends shown in Table 1 were made by dry blending the pellets in a plastic bag. The pellets were added to a 19 mm Brabender single-screw extruder with an L/D ratio of 25/1. The extruder was equipped with a mixing screw with a 3:1 compression ratio and six rows of staggered pins near the nozzle. A screw speed of 90 rev/min. was used. The average residence time in the extruder was 1.5 minutes. All zones were set at 300° C. The actual melt temperature was 305°–310° C. The extruded rod was quenched in water and chopped. The pellets were then crystallized for 3 hours at 160° C. in a forced air drying unit and dried for another 24 hours at 100° C. The properties of the pellets (Ih.V., Tg and Tm) are shown in Table 1, below.

TABLE 1

| Ex # | PET/PEN (gm) | PEN wt % | IV dL/g | Tg (°C.) | Tm (°C.) |
|---|---|---|---|---|---|
| 1 | 300/0 | 0 | 0.643 | 77.1 | 252 |
| 2 | 276/24 | 8 | 0.621 | 82.3 | 245 |
| 3 | 123/130 | 51.4 | 0.552 | 98.7 | 235 |
| 4 | 35/270 | 88.5 | 0.517 | 118 | 259 |
| 5 | 0/300 | 100 | 0.503 | 123 | 267 |

The crystallized and dried pellets were extruded through a 19 mm Brabender single screw extruder twice more as described above. The pellets were crystallized and dried for 8 and 4 hours at 160° C. after the second and third extruder passes, respectively, in a forced air drying unit. Fluorescence data are summarized in Table 2, below.

TABLE 2

| Ex # | PEN wt % | max wvlng (nm)[1] | fluor intens[1] | max wvlng (nm)[2] | fluor intens[2] |
|---|---|---|---|---|---|
| 1 | 0 | 385 | 259 | — | — |
| 2 | 8 | 413 | 1232 | 408 | 1271 |
| 3 | 51.4 | 422 | 1121 | 423 | 1154 |
| 4 | 88.5 | 425 | 1111 | 425 | 1052 |
| 5 | 100 | 426 | 1065 | 426 | 1164 |

[1]First Pass through extruder.
[2]Third Pass through extruder.

Thus Examples 1 through 5 clearly show that when PEN is included, even in small amounts, the resultant polyester blends displays fluorescence which is just as high as the PEN homopolymer.

Example 6

Preparation of PET with 15 mol % copolymerized dimethyl-1-benzoyl-2,6-naphthalene dicarboxylate (PET-co-15BnzN)

Dimethyl terephthalate (0.26 moles, 49.5 grams), dimethyl 1-benzoyl-2,6-naphthalene dicarboxylate (0.045 moles, 15.7 grams), ethylene glycol (0.60 moles, 37.2 grams) and catalyst metals which consisted of 55 ppm Mn from $Mn(OAc)_2$ and 200 ppm Sb from $Sb(OAC)_3$ were placed in a 0.5 liter polymerization reactor under a nitrogen atmosphere. The mixture was heated with stirring at 200° C. for 2 hours. The temperature was increased to 220° C. and maintained for 1 hour. The temperature was increased to 285° C. which took approximately 20 minutes. Phosphorous (60 ppm) was added in the form of a phosphate ester. When the temperature reached 285° C., the nitrogen flow was stopped and vacuum was applied. The polymer was stirred under vacuum (0.1–0.3 mm Hg) for about 45 minutes. The polymer was cooled and ground to 3–4 mm in size. The Ih.V. was 0.480 dL/g. The Tg was 94.3° C. No melting point was observed. The maximum wavelength observed was 428 nm and the fluorescence intensity was 10.

Example 7

Preparation of PET with 15 mol % copolymerized 4,4'-bis(2-hydroxyethylthio)biphenyl (PET-co-15BphSEG)

Dimethyl terephthalate (0.25 moles, 48.5 grams), 4,4'-bis(2-hydroxyethylthio)biphenyl (0.038 moles, 11.48 grams), ethylene glycol (0.46 moles, 26.7 grams) and catalyst metals as described in Example 1 were placed in a 0.5 liter polymerization reactor under a nitrogen atmosphere. The mixture was heated with stirring at 200° C. for 2 hours. The temperature was increased to 220° C. and maintained for 1 hour. The temperature was increased to 285° C. which took approximately 20 minutes. Phosphorus source was added as described in Example 1. When the temperature reached 285° C., the nitrogen flow was stopped and vacuum was applied. The polymer was stirred under vacuum (0.1–0.3 mm Hg) for about 45 minutes. The polymer was cooled and ground to 3–4 mm in size. The Ih.V. was 0.282 dL/g. The Tg was 66.1° C. and the Tm was 214.0° C. The max wavelength was 455 nm and the fluorescence intensity was 25.

Examples 8–11

The polymer/PET-quencher blends shown in Table 3, below were made as follows. The polymer pellets (EASTMAN PEN homopolymer 14991, EASTMAN PET 12440 and MILES M-2608 bisphenol A polycarbonate) were dried overnight at 140° C. in a forced air drying unit. PET-co-15BnzN and PET-co-15BphSEG (both ground samples, 3–4 mm) were dried for 16 hours at 70° C. in a vacuum oven (10–20 Torr) with a nitrogen sweep. The blend components were blended in a plastic bag and extruded as described in Example 1. The properties of the pellets are shown in Table 3, below.

TABLE 3

| Ex # | Polym (gm) | Quenchr (gm) | IV dL/g | Tg (°C.) | Tm (°C.) |
|---|---|---|---|---|---|
| 8 | PEN (280) | 1 (20) | 0.492 | 121 | 263 |
| 9 | PEN (30) PET (245) | 1 (24) | 0.601 | 85 | 239 |
| 10 | PEN (270) PET (10) | 2 (20) | 0.473 | 118 | 261 |
| 11 | PEN (147) PC (140) | 2 (13) | 0.420 | 117 | 260 |

Quencher 1 = PET-co-15BnzN
Quencher 2 = PET-co-15BphSEG

The pellets were further crystallized, reextruded, crystallized and dried as described in Example 1. The fluorescence properties are shown in Table 4, below.

TABLE 4

| Ex # | PEN (wt %) | Q (wt %) | max wvlng (nm)[1] | fluor intens[1] | max wvlng (nm)[2] | fluor intens[2] |
|---|---|---|---|---|---|---|
| 8 | 93.3 | 1.62 | 427 | 732 | 426 | 677 |
| 9 | 10 | 1.96 | 423 | 553 | 417 | 453 |
| 10 | 90 | 1.34 | 427 | 364 | 429 | 376 |
| 11 | 49 | 0.87 | 425 | 337 | 427 | 373 |

[1]first pass through extruder.
[2]third pass through extruder.

Thus the blends of the present invention display fluorescence intensity (Example 8-677) which is about half that of the blends (Example 5-1164) which do not contain a quencher therein. Thus, the PEN blend compositions of the present invention display greatly reduced fluorescence.

The PEN reduced fluorescence blend compositions of the present invention are useful in applications where good heat resistance, high glass transition temperature, and gas barrier properties are required.

We claim:

1. A blend comprising:
   (a) a polyester/amide comprising:
      (1) a dicarboxylic acid component which comprises at least 0.1 mol % of a dicarboxylic acid selected from the group consisting of terephthalic acid, terephthalate ester, isophthalic acid, isophthalic ester, and mixtures thereof;
      (2) a diol component, a diamine component, or a mixture thereof; and
      (3) 0.1 to 99.9 mol %, based on 100 mol % dicarboxylic acid and 100 mol % diol, of a copolymerizable fluorescence quenching compound;
   (b) a second polymer selected from the group consisting of poly(alkylene terephthalate) homo and copolyesters, poly(alkylene naphthalate) homo and copolyesters, poly(cycloalkylene terephthalate) homo and copolyesters, poly(alkylene 1,4-cyclohexanedicarboxylate) homo and copolyesters, and polycarbonate homo and copolymers.

2. The blend of claim 1 wherein said dicarboxylic acid component comprises at least 0.1 mol % terephthalic acid or ester, isophthalic acid or esters or mixtures thereof.

3. The blend of claim 2 wherein said dicarboxylic acid component is terephthalic acid or ester.

4. The blend of claim 2 wherein said dicarboxylic acid component is modified with up to 50 mol % of at least one second dicarboxylic acid selected from the group consisting of acids, acid anhydrides, esters and acid chlorides of aromatic dicarboxylic acids having 8 to 14 carbon atoms, aliphatic dicarboxylic acids having 4 to 12 carbon atoms and cycloaliphatic dicarboxylic acids having 8 to 12 carbon atoms, and mixtures thereof.

5. The blends of claim 4 wherein said at least one second dicarboxylic acid is selected from the group consisting of 1,4-, 1,5-, 2,7-, 1,2-, 1,3-, 1,6-, 1,7-, 1,8-, 2,3-, 2,4-, 2,5-, 2,6- and 2,8-naphthalenedicarboxylic acids, phthalic acid; isophthalic acid; cyclohexanediacetic acid; diphenyl 4,4'-dicarboxylic acid; succinic acid; glutaric acid; adipic acid; fumaric acid; azelaic acid; resorcinoldiacetic acid; diglycolic acid; 4,4'-oxybis(benzoic) acid; biphenyldicarboxylic acid; 1,12-dodecanedicarboxylic acid; 4,4'-sulfonyldibenzoic acid; 4,4'-methyldibenzoic acid; trans 4,4'-stilbenedicarboxylic acid; 1,2-, 1,3-, and 1,4-cyclohexane dicarboxylic acids; and mixtures thereof.

6. The blend of claim 1 wherein said diol component is selected from the group consisting of cycloaliphatic diols having 6 to 20 carbon atoms and aliphatic diols having 2 to 20 carbon atoms.

7. The blend of claim 6 wherein said diol component is selected from the group consisting of ethylene glycol, diethylene glycol, triethylene glycol, 1,4-cyclohexanedimethanol, 1,3-propanediol, 1,4-butanediol, 1,5-pentanediol, 1,6-hexanediol, 2,2-dimethyl-1,3-propanediol, 1,10-decanediol, 2,2,4,4-tetramethyl-1,3-cyclobutanediol, 3-methyl-2,4-pentanediol, 2-methyl-1,4-pentanediol, 2,2,4-trimethyl-1,3-pentanediol, 2-ethyl-1,3-hexanediol, 2,2-diethyl-1,3-propanediol, 1,3-hexanediol, 1,4-bis-(hydroxyethoxy)benzene, 2,2-bis-(4-hydroxycyclohexyl)-propane, 2,4-dihydroxy-1,1,3,3-tetramethylcyclobutane, 2,2-bis-(3-hydroxyethoxyphenyl)

propane, 2,2-bis-(4-hydroxypropoxyphenyl)propane and mixtures thereof.

8. The blend of claim 6 wherein said diol component is ethylene glycol, 1,4-butanediol, cyclohexane-dimethanol, or a mixture thereof.

9. The blend of claim 6 wherein said diol component further comprises up to about 20 mol % of a second diol selected from the group consisting of ethylene glycol, diethylene glycol, triethylene glycol, 1,4-cyclohexanedimethanol, 1,3-propanediol, 1,4-butanediol, 1,5-pentanediol, 1,6-hexanediol, 2,2-dimethyl-1,3-propanediol, 1,10-decanediol, 2,2,4,4-tetramethyl-1,3-cyclobutanediol, 3-methyl-2,4-pentanediol, 2-methyl-1,4-pentanediol, 2,2,4-trimethyl-1,3-pentanediol, 2-ethyl-1,3-hexanediol, 2,2-diethyl-1,3-propanediol, 1,3-hexanediol, 1,4-bis-(hydroxyethoxy)benzene, 2,2-bis-(4-hydroxycyclohexyl)-propane, 2,4-dihydroxy-1,1,3,3-tetramethylcyclobutane, 2,2-bis-(3-hydroxyethoxyphenyl) propane, 2,2-bis-(4-hydroxypropoxyphenyl)propane and mixtures thereof.

10. The blend of claim 1 wherein said diamine component has the formula —NH—R—NH— where R is alkylene, cycloalkylene, arylalkylene, or arylene.

11. The blend of claim 1 wherein said copolymerizable fluorescence quenching compound comprises a compound of Formula I

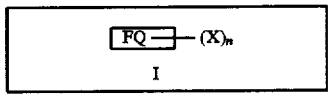

wherein FQ is a fluorescence quencher moiety selected from the group consisting of aromatic ketones, halogen containing aromatic compounds and aromatic thioether compounds; X is a polyester reactive group; n is 1 to 4.

12. The blend of claim 11 wherein n is 2.

13. The blend of claim 12 wherein said polyester reactive groups are selected from the group consisting of aliphatic hydroxy, carboxy, amino, $C_1$ to $C_6$ alkylamino and ester radicals having the formulae:

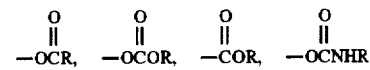

wherein R is selected from $C_1$ to $C_6$-alkyl, $C_5$ to $C_7$-cycloalkyl, phenyl or substituted phenyl.

14. The blend of claim 13 wherein said polyester reactive group is aliphatic hydroxy group having a formula $(CH_2)_mOH$, wherein m is an integer from 1 to 6.

15. The blend of claim 14 wherein m is 2.

16. The blend of claim 1 wherein said at least one second polymer is selected from the group consisting of poly (alkylene terephthalate) homo and copolyesters, poly (alkylene naphthalate) homo and copolyesters, poly (cycloalkylene terephthalate) homo and copolyesters, poly (alkylene 1,4-cyclohexanedicarboxylate) homo and copolyesters, and polycarbonate homo and copolymers.

17. Process for preparing a blend which exhibits reduced fluorescence comprising melt blending:

(a) a polyester/amide comprising:

(1) a dicarboxylic acid component which comprises at least 0.1 mol % of a dicarboxylic acid selected from the group consisting of terephthalic acid, terephthalate ester, isophthalic acid, isophthalic ester, and mixtures thereof;

(2) a diol component, a diamine component, or a mixture thereof; and (3) 0.1 to 99.9 mol %, based on 100 mol % dicarboxylic acid and 100 mol % diol, of a copolymerizable fluorescence quenching compound;

(b) a second polymer selected from the group consisting of poly(alkylene terephthalate) homo and copolyesters, poly(alkylene naphthalate) homo and copolyesters, poly(cycloalkylene terephthalate) homo and copolyesters, poly(alkylene 1,4-cyclohexanedicarboxylate) homo and copolyesters, and polycarbonate homo and copolymers.

* * * * *